(12) United States Patent
Lyons

(10) Patent No.: US 8,519,634 B2
(45) Date of Patent: Aug. 27, 2013

(54) EFFICIENT POWER SUPPLY FOR SOLID STATE LIGHTING SYSTEM

(75) Inventor: Steven S. Lyons, Herndon, VA (US)

(73) Assignee: ABL IP Holding LLC, Conyers, GA (US)

( * ) Notice: Subject to any disclaimer, the term of this patent is extended or adjusted under 35 U.S.C. 154(b) by 655 days.

(21) Appl. No.: 12/753,548

(22) Filed: Apr. 2, 2010

(65) Prior Publication Data

US 2011/0109237 A1 May 12, 2011

Related U.S. Application Data

(60) Provisional application No. 61/258,821, filed on Nov. 6, 2009.

(51) Int. Cl.
*H05B 37/02* (2006.01)

(52) U.S. Cl.
USPC .......................... 315/291; 315/307; 315/308

(58) Field of Classification Search
USPC .............. 315/291, 185 R, 300, 302, 307, 308
See application file for complete search history.

(56) References Cited

U.S. PATENT DOCUMENTS

| | | | |
|---|---|---|---|
| 6,969,843 B1 | 11/2005 | Beach et al. | |
| 7,148,632 B2 | 12/2006 | Berman et al. | |
| 2007/0024213 A1* | 2/2007 | Shteynberg et al. | 315/291 |
| 2008/0018261 A1* | 1/2008 | Kastner | 315/192 |
| 2008/0316781 A1 | 12/2008 | Liu | |
| 2009/0189539 A1 | 7/2009 | Deng et al. | |
| 2010/0026208 A1* | 2/2010 | Shteynberg et al. | 315/297 |
| 2010/0111123 A1* | 5/2010 | Fujimura et al. | 372/38.07 |

FOREIGN PATENT DOCUMENTS

| | | |
|---|---|---|
| EP | 1 860 922 A1 | 11/2007 |
| WO | WO 2007/141741 A1 | 12/2007 |
| WO | WO 2009/039112 A1 | 3/2009 |

OTHER PUBLICATIONS

International Preliminary Report on Patentability and written opinion thereof, issued in International PCT/US2010/055580 dated May 18, 2012.
Data Sheet for "LM3445 Triac Dimmable Offline LED Driver", Oct. 9, 2009 © 2009 National Semiconductor Corporation.
LM3445 120V Small Eval Board, Schematic: 870600336, Rev. A, Mar. 10, 2009, © 2009 National Semiconductor Corporation.
International Search Report and Written Opinion of the International Searching Authority issued in International Patent Application No. PCT/US2010/055580, mailed Feb. 21, 2011.

* cited by examiner

*Primary Examiner* — Jimmy Vu
*Assistant Examiner* — Henry Luong
(74) *Attorney, Agent, or Firm* — RatnerPrestia

(57) ABSTRACT

Drive circuitry drives a plurality of solid state light emitters coupled between a higher voltage node and a lower voltage node. The drive circuitry includes a switching regulator, such as a buck regulator, having a switch and an inductive element coupled between the switch and the lower voltage node to electrically connect the switch to the lower voltage node. A controller drives the switch in accordance with an output signal produced by the solid state light emitters. Input power supply circuitry supplies an input power supply signal for providing a voltage level at the higher voltage node to operate the solid state light emitters. The input power supply circuitry is configured for supplying the controller with a first power supply signal produced based on the input power supply signal. Operation power supply circuitry is electrically connected to the lower voltage node for supplying the controller with a second power supply signal when the voltage level developed at the lower voltage node is sufficient to support operation of the controller.

12 Claims, 1 Drawing Sheet

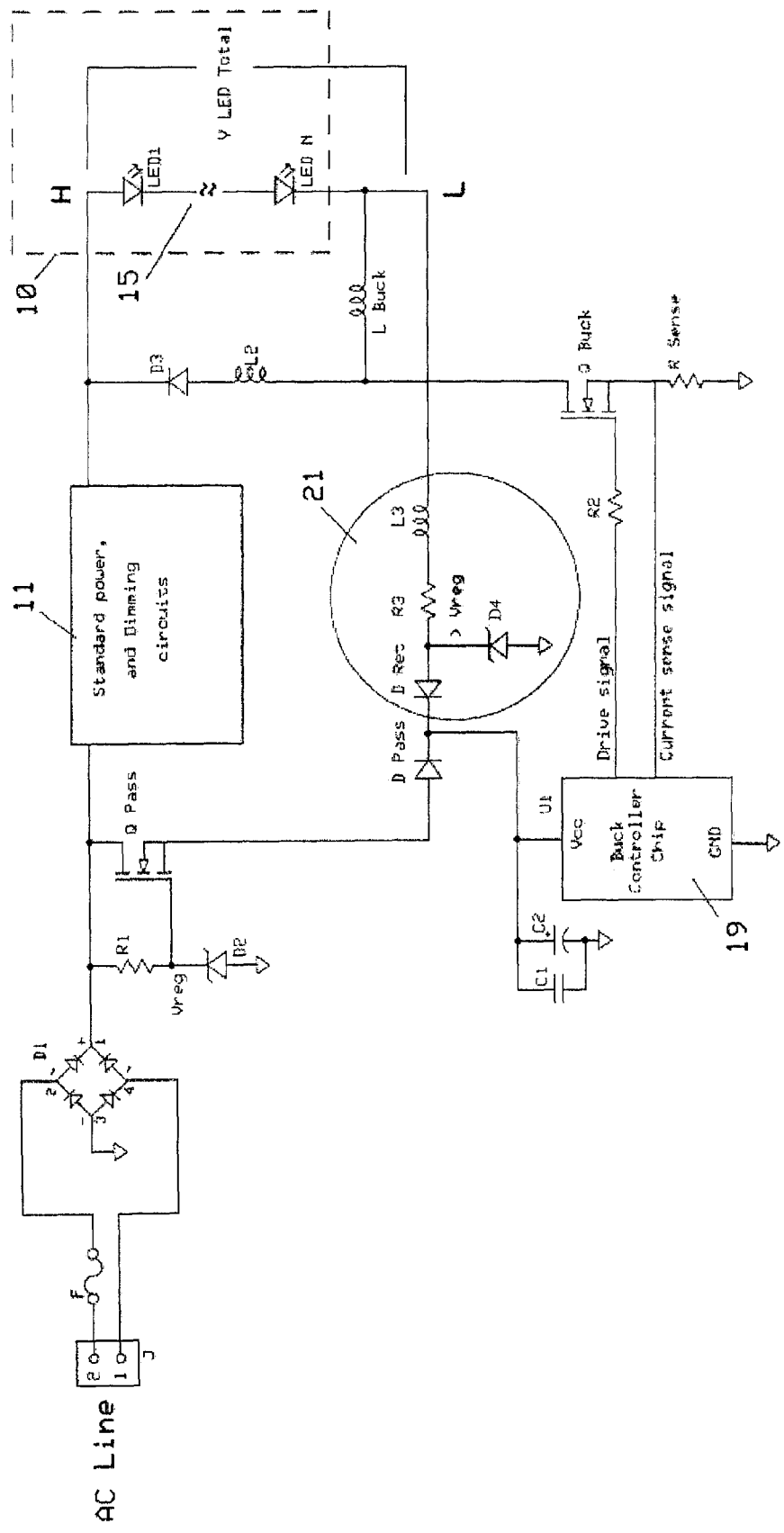

EFFICIENT POWER SUPPLY FOR SOLID STATE LIGHTING SYSTEM

RELATED APPLICATIONS

This application claims priority of and incorporates by reference provisional U.S. patent application No. 61/258,821 filed on Nov. 6, 2009 and entitled "EFFICIENT POWER SUPPLY FOR SOLID STATE LIGHTING SYSTEM."

TECHNICAL FIELD

The present teachings relate to a power supply for a LED type light fixture offering improved efficiency, to a method of operation of the power supply, and to a lighting system that includes the power supply and fixture.

BACKGROUND

As costs of energy increase along with concerns about global warming due to consumption of fossil fuels to generate energy, there is an every increasing need for more efficient lighting technologies. These demands, coupled with rapid improvements in semiconductors and related manufacturing technologies, are driving a trend in the lighting industry toward the use of solid state light sources, such as light emitting diodes (LEDs) or the like, to produce light for general lighting applications, as replacements for incandescent lighting and eventually as replacements for other older less efficient light sources.

However, in this age of ever increasing concern over energy consumption, there is always a need for techniques to still further improve efficiency of solid state lighting fixtures or systems. Manufacturers of the LEDs continue to try to improve performance efficiency of the LEDs, and lighting fixture manufacturers continue to improve the optical design of the lighting fixtures to provide desirable light output characteristics (e.g. high quality white light) with minimal loss of light power in the optic(s) of the fixtures.

Another area of concern regarding efficiency relates to the electrical circuitry that drives the LEDs. Although modern driver and power supply circuits are fairly efficient, some power is consumed within the power supply before transfer as drive current to the LEDs.

The above developments not withstanding, there is still room for improved efficiency in LED lighting. For example, some power is still wasted in the LED power supply. Even a small reduction in such power loss (increase in efficiency) can provide a significant overall improvement in the performance of the LED lighting system. Hence, a need exists for still further improvement in the power supply circuitry of a LED lighting system.

SUMMARY

The inventive concepts provide improved efficiency, by reducing power consumed within the power supply, for driving multiple solid state light emitters, such as light emitting diodes (LEDs) of a lighting system. In accordance with one aspect of the disclosure, drive circuitry drives a plurality of solid state light emitters coupled between a first node and a second node, a first voltage level provided at the first node is higher than a second voltage level provided at the second node. The drive circuitry comprises a switching regulator, such as a buck regulator, having a switch and an inductive element coupled between the switch and the second node to electrically connect the switch to the second node. A controller controls the switch in accordance with an output signal produced by the solid state light emitters to drive them. Input power supply circuitry supplies an input power supply signal for providing the first voltage level at the first node to operate the solid state light emitters. The input power supply circuitry is configured for supplying the controller with a first power supply signal produced based on the input power supply signal. Operation power supply circuitry is electrically connected to the second node for supplying the controller with a second power supply signal when the second voltage level developed at the second node is sufficient to support operation of the controller.

For example, the controller may be supplied with the second power supply signal when current flowing through the LEDs between the first node and the second node provides the second voltage level at the second node sufficient to support operation of the controller.

When the second voltage level at the second node exceeds the voltage level provided from the input power supply circuitry to the controller, the operating power supply circuit may be enabled to supply the controller with the second power supply signal and the input power supply circuitry may be prevented from supplying the first power supply signal.

In the example, a first unidirectional conduction device, such as a diode, may be arranged for providing the first power supply signal from the input power supply circuitry to the controller, and a second unidirectional conduction device, such as a diode, may be arranged for providing the second power supply signal to the controller. The first unidirectional conduction device in an on state, and the second unidirectional conduction device is in an off state when the second voltage level at the second node is not sufficient to support operation of the controller. The first unidirectional conduction device is turned into an off state, and the second unidirectional conduction device is turned into an on state when the second voltage level developed at the second node becomes sufficient to support operation of the controller.

The operation power supply circuit may include a voltage reference circuit for defining a reference voltage applied to turn the first unidirectional conduction device into an off state, and to turn the second unidirectional conduction device into an on state.

Further, the operation power supply circuitry may include a filtering element coupled to the second node for reducing high frequency noise, and a current limiting element for limiting current drawn through the operation power supply circuitry.

The input power supply circuitry may include an input switching element, such as a FET, controlled to produce the first power supply signal based on the input power supply signal.

In accordance with another aspect of the disclosure, a lighting system comprises a LED type light fixture and power supply circuitry for the light fixture. The light fixture includes multiple LEDs coupled between a first node and a second node. The power supply circuitry includes input voltage supply circuitry for providing voltage at the first node and a switching regulator having a switch and an inductive element coupled between the switch and the second node to electrically connect the switch to the second node. A controller controls the switch in accordance with current flowing through the LEDs. The input voltage supply circuitry is configured for supplying the controller with a first power supply signal. Operation power supply circuitry is electrically connected to the second node for supplying the controller with a second power supply signal when voltage provided at the second node becomes sufficient to support operation of the controller.

The operation power supply circuitry may be configured for preventing the input voltage supply circuitry from providing the first power supply signal to the controller when the voltage provided at the second node becomes sufficient to support operation of the controller.

In accordance with the present disclosure, a method is offered for providing efficient power supply to a LED type light fixture including multiple LEDs coupled between a first node and a second node. The method comprises controlling the LEDs by a controller in accordance with value of current flowing through the LEDs, supplying an input power supply signal for providing a first voltage level at the first node to operate the LEDs, applying this input power supply signal to provide the controller with a first power supply signal, and providing a second power supply signal to the controller from the second node when a second voltage level developed at the second node becomes sufficient to support operation of the controller. The first power supply signal may be prevented from being supplied to the controller when the second power supply signal is supplied.

This method may increase the efficiency of power supply by about 1.5% overall, in a specific example discussed in detail below.

Additional objects, advantages and novel features of the examples will be set forth in part in the description which follows, and in part will become apparent to those skilled in the art upon examination of the following and the accompanying drawings or may be learned by implementation or operation of the examples.

BRIEF DESCRIPTION OF THE DRAWINGS

The drawing FIGURE depicts concepts by way of example, not by way of limitations. In the figures, like reference numerals refer to the same or similar elements.

FIG. A is a circuit diagram of a LED lighting system, including LEDs and electrical elements forming the LED power supply.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

FIG. A illustrates an exemplary circuit for supplying power to solid state lighting emitters, such as LEDs, for generating light for a general lighting application. For example, the power supply circuit discussed in the present disclosure can be utilized in a lighting system disclosed in copending U.S. patent application Ser. No. 12/609,523, filed on Oct. 30, 2009, entitled "HEAT SINKING AND FLEXIBLE CIRCUIT BOARD, FOR SOLID STATE LIGHT FIXTURE UTILIZING AN OPTICAL CAVITY," and incorporated herewith by reference.

Input power supply circuitry for providing power supply to a LED type light fixture 10 applies alternating current at normal line voltage (e.g. around 120V in the US) through a fuse (F) and includes bridge rectifier (D1) formed by four bridge connected diodes. A resistor (R1) and Zener diode (D2) provide a regulated voltage (V reg) input to a pass transistor (Q Pass). The pass transistor (Q Pass) drops the rectified voltage by an amount controlled by V Reg. Both the dropped voltage from the pass transistor (Q Pass) and the rectified voltage from the rectifier bridge (D1) are applied to the power and dimming circuits (11). The dropped voltage from the pass transistor (Q Pass) is also applied to a diode (D Pass) and regulated to provide operating power to a controller or 'driver' chip (19), as will be discussed in more detail, later. The power and dimming circuits (11) include a valley fill circuit, which fills the valleys somewhat in the waveform of the rectified voltage. The circuits (11) also provide power level control for dimming in response to a triac controlled variation in the AC input, in a standard manner. A variety of different power and dimming circuits are well known.

The output of the power and dimming circuits (11) provides the DC voltage and current to the anode side of LEDs (15) in the LED type lighting fixture 10, to drive the LEDs (15) to emit light. The LEDs (15) in this implementation are all of the same color type. For example, the LEDs (15) could all be ultraviolet (UV), near UV or blue LEDs, in order to pump an appropriate phosphor material in the lighting fixture. However, for discussion purposes, we will assume that the LEDs (15) are rated for the same color temperature of white light output, as might be desired for a particular general lighting application. There may be any number of LEDs as needed to generate sufficient light output for the intended lighting application. In the example, we will assume that there are 18 of the LEDs, although obviously the power supply of FIG. A could drive fewer or more of the LEDs (15).

In the example, the 18 LEDs (15) are connected in series as a string between a higher voltage node H and a lower voltage node L. At normal maximum operating power (full ON of the lighting system), the high voltage node H coupled to the output of the power and dimming circuits (11) is at the rectified line voltage level of around 120V DC. When operating to emit light, there is a voltage drop across each LED in the series connected string. The voltage drop across LEDs, from the high voltage node to the low voltage node L, is about 55 volts, with 18 LEDs as in our example.

As noted, the standard power and dimming circuits (11) smoothes the rectified waveform, to provide direct current (DC) voltage and current to the LEDs (15) at a set level, and the DC level is controllable to allow user control (e.g. dimming) of the light output. However, to provide a more precise regulated drive current for the LEDs, the illustrated power supply includes a switching regulator, such as a buck regulator including an inductor (L Buck) coupled to the lower voltage node L of the string of LEDs (15), and a transistor (Q Buck) electrically connected to the inductor (L Buck) and controlled by a buck controller chip (19) via a resistor (R2).

The example utilizes a constant off time implementation of the buck regulator. The transistor (Q Buck) of the regulator charges up the inductor (L Buck) to maintain the voltage at the lower or cathode side of the LED string. Changing the frequency of switching of the regulator transistor (Q Buck) changes the voltage across the inductor (L Buck), to stabilize the current flow and thereby compensate for any ripple remaining on the rail from power and dimming circuits (11).

The controller (19) controls the switching of the regulator transistor (Q Buck) in response to a sensing voltage from a current sensing resistor (R Sense). The example uses a National Semiconductor's LM3445 driver chip for the buck controller chip (19). Current from the LED string flows through the inductor (L Buck), the transistor (Q Buck) and the current sensing resistor (R Sense). The controller chip (19)

triggers variations in the switching of the regulator transistor (Q Buck) to compensate for sensed variations of the LED current, and thus stabilize the current flow. The illustrated system also includes an inductor (L2) and diode (D3) connected back to the high DC voltage input rail between the circuits (11) and the string of LEDs (15), to protect the LEDs from possible damage due to a flyback pulse from the buck regulator.

The power saving efficiency of the illustrated circuit relates to the manner in which the controller (19) obtains its power, particularly during normal light emissions from the LEDS. In a conventional arrangement, the controller (19) for the buck regulator, in this case the LM3445 driver chip, would draw its operating power from the transistor (Q Pass). A diode (D Pass) and one or more capacitors (C1, C2) smooth the rectified voltage from the transistor (Q Pass) to provide the requisite DC power voltage to operate the controller (19). In the circuit of FIG. A, the controller (19) for the buck regulator would still draw power in this way when the lighting system turns ON, until sufficient current flows through the LEDs to provide power for the controller (19) from operation power supply circuitry (21) used to supply power from the lower voltage node L of the LED string.

In the example, the operation power supply circuitry (21) includes an inductor (L3) coupled to the lower voltage node L of the LED string and a resistor (R3). The inductor provides some filtering, to block high frequency noise. The resistor (R3) limits the amount of current drawn through the operation power supply circuitry (21), so that the operation power supply circuitry (21) and the controller (19) do not significantly load the LED string or change its current in a significant way.

The Zener diode (D4) defines a regulated reference DC voltage (>Vreg) that is higher than the regulated voltage (Vreg) from the pass transistor (Q Pass) by a predetermined voltage value, which is at least enough to bias off (turn-off) the pass diode (D Pass). In this way, the cathode side of the diode (D RET) is sufficiently higher than the cathode side of the pass diode (D Pass) to turn on the diode (D RET) but turn the pass diode (D Pass) off. This allows the diode (D RET) to supply current to the controller (19) while turning off the pass diode (D Pass) to block current flow from the pass transistor (Q Pass).

The reason the illustrated power supply circuit functions more efficiently is that the transistor (Q Pass) normally drops the rectified line voltage down to about 10 volts to operate the LM3445 driver chip (controller 19). The current is only about 3 mA, but when you take the power dissipated by the pass transistor (Q Pass) by having to drop about 110V using the formula P=I×E, you get 0.003×120 or 0.36 Watts of wasted power.

When power is applied to the circuit of FIG. A (transition from OFF state to ON state), the resistor (R1) and Zener diode (D2) establish the regulated input voltage to the pass transistor (Q Pass). In response, the pass transistor (Q Pass) regulates rectified line voltage down to a level defined by the regulated input voltage (V reg). In the transition from the OFF state to the ON state, the LEDs have not yet received current to turn ON or allowed power to flow through the operation power supply circuitry (21). Hence, the dropped voltage from the pass transistor (Q Pass) will turn on the pass diode (D Pass). The capacitors C1 and C2 regulate the voltage to initially provide power to the controller (19). This initial power allows the controller (19) to begin operating the buck regulator.

However, once the voltage at the high voltage node H of the string of LEDs (15) is sufficient to turn on the LEDs, current flows through the string of LEDs (15) from the higher voltage node H to the lower voltage node L, and the LEDs emit light. However, at that time, current also flows to the operation power supply circuitry 21. Looking at the driver output to the LED string shows that the higher voltage node H of the LED string is sitting at the rectified line voltage level of around 120V DC. The LED string of 18 LEDs (15) in series requires about 55 Volts to operate at a current of 220 mA. The lower node L of the LED string is still at a voltage that is significantly higher than the voltage necessary to operate the driver chip (19) which needs at least 8 Volts DC to operate.

Taking the voltage at the lower node L of the LED string (120−55=65V) and feeding it back to the driver chip (19) through a filter (which includes the inductor L3 and the resistor R3) and the Zener regulator diode D4 that is sized to be a couple of volts higher than the Q Pass voltage) and finally through a reverse blocking diode (D Ret), causes the pass diode (D Pass) to be reverse biased, therefore turning it off. The voltage drop across the LEDs produces light, whereas the voltage drop across Q Pass to power the controller 19 does not. Once on, the circuit (21) powers the LM3445 driver chip (19) with about half of the original voltage drop across pass transistor (Q Pass). This in turn increases the efficiency of the power supply by about 1.5% overall.

Other methods are being explored, but this method is extremely inexpensive and does not require a custom inductor or a flyback transformer to provide a feedback voltage for the driver chip to operate.

The power supply in the drawing uses the voltage drop provided by the LEDs as an alternative to wasting power through a pass transistor once the circuit starts up.

Those skilled in the art will recognize that the LED power supply concepts disclosed herein have wide applicability and may admit of a wide range of modifications. For example, the power supply and LEDs shown in FIG. A may be used with a wide variety of different types of light fixture optics, to form efficient LED lighting systems. Copending U.S. patent application Ser. No. 12/609,523, filed on Oct. 30, 2009, and entitled "HEAT SINKING AND FLEXIBLE CIRCUIT BOARD FOR SOLID STATE LIGHT FIXTURE UTILIZING AN OPTICAL CAVITY" discloses just a few examples of LED type light fixtures and efficient optical elements for the light fixtures, where the LEDs in the light fixtures could be driven by the power supply in a manner analogous to that shown in FIG. A of the present application. Also, the LM3445 driver chip is given here by way of an example of an available LED driver chip. Obviously, the concepts embodied in the power supply drawing of FIG. A may be implemented with other types of driver chips.

While the foregoing has described what are considered to be the best mode and/or other preferred examples, it is understood that various modifications may be made therein and that the invention or inventions disclosed herein may be implemented in various forms and examples, and that they may be applied in numerous applications, only some of which have been described herein.

What is claimed is:

1. Drive circuitry for driving a plurality of solid state light emitters coupled between a first node and a second node, a first voltage level provided at the first node being higher than a second voltage level provided at the second node, the drive circuitry comprising:
   a switching regulator having a switch and an inductive element coupled between the switch and the second node to electrically connect the switch to the second node,
   a controller for controlling the switch in accordance with an output signal produced by the solid state light emitters to drive the solid state light emitters, input power supply circuitry for supplying an input power supply signal to provide the first voltage level at the first node, the input power supply circuitry being configured for supplying the controller with a first power supply signal produced based on the input power supply signal, operation power supply circuitry electrically connected to the second node for supplying the controller with a second power supply signal when the second voltage level developed at the second node is sufficient to support operation of the controller, a first unidirectional conduction device configured for providing the first power supply signal from the input power supply circuitry to the controller, and a second unidirectional conduction device configured for providing the second power supply signal to the controller, wherein:

the first unidirectional conduction device is in an on state, and the second unidirectional conduction device is in an off state when the second voltage level at the second node is not sufficient to support operation of the controller, and the first unidirectional conduction device is turned into an off state, and the second unidirectional conduction device is turned into an on state when the second voltage level at the second node becomes sufficient to support operation of the controller.

2. The circuitry of claim 1, wherein the solid state light emitters include multiple light emitting diodes (LEDs) coupled between the first node and the second node.

3. The circuitry of claim 2, wherein the operation power supply circuitry is configured to provide the second power supply signal when current flowing through the LEDs between the first node and the second node provides the second voltage level at the second node sufficient to support operation of the controller.

4. The circuitry of claim 1, wherein the operation power supply circuitry provides the controller with the second power supply signal when the second voltage level at the second node exceeds a voltage level provided from the input power supply circuitry to the controller.

5. The circuitry of claim 4, wherein the input power supply circuitry is prevented from supplying the first power supply signal to the controller when the voltage level at the second node exceeds the voltage level provided from the input power supply circuitry to the controller.

6. The circuitry of claim 1, wherein the operation power supply circuit includes a voltage reference circuit for defining a reference voltage applied to turn the first unidirectional conduction device into the off state, and to turn the second unidirectional conduction device into the on state.

7. The circuitry of claim 6, wherein the operation power supply circuitry further includes a filtering element coupled to the second node for reducing high frequency noise.

8. The circuitry of claim 6, wherein the operation power supply circuitry further includes a current limiting element for limiting current drawn through the operation power supply circuitry.

9. The circuitry of claim 1, wherein the input power supply circuitry includes an input switching element controlled to produce the first power supply signal based on the input power supply signal.

10. The circuitry of claim 1, wherein the switching regulator is configured to operate in a buck mode.

11. A lighting system comprising a LED type light fixture and power supply circuitry for the light fixture, the light fixture including multiple LEDs coupled between a first node and a second node, the power supply circuitry including:

input voltage supply circuitry for providing voltage at the first node, a switching regulator having a switch, and an inductive element coupled between the switch and the second node to electrically connect the switch to the second node, a controller for controlling the switch in accordance with current flowing through the LEDs, the input voltage supply circuitry being configured for supplying the controller with a first power supply signal, operation power supply circuitry electrically connected to the second node for supplying the controller with a second power supply signal when voltage provided at the second node becomes sufficient to support operation of the controller;

a first unidirectional conduction device configures for providing the first power supply signal from the input power supply circuitry to the controller, and a second unidirectional conduction device configured for providing the second power supply signal to the controller, wherein:

the first unidirectional conduction device is in an on state, and the second unidirectional conduction device is in an off state when the voltage at the second node is not sufficient to support operation of the controller, and the first unidirectional conduction device is turned into an off state, and the second unidirectional conduction device is turned into an on state when the voltage at the second node becomes sufficient to support operation of the controller.

12. The system of claim 11, wherein the operation power supply circuitry is configured for preventing the input voltage supply circuitry from providing the first power supply signal to the controller when the voltage provided at the second node becomes sufficient to support operation of the controller.

* * * * *